(12) United States Patent
Kobayashi et al.

(10) Patent No.: US 10,060,418 B2
(45) Date of Patent: Aug. 28, 2018

(54) SOLAR HEAT RECEIVER AND SOLAR HEAT POWER GENERATION DEVICE

(71) Applicant: MITSUBISHI HEAVY INDUSTRIES, LTD., Minato-ku, Tokyo (JP)

(72) Inventors: Kazuta Kobayashi, Tokyo (JP); Masashi Tagawa, Tokyo (JP); Toshiyuki Osada, Tokyo (JP); Takeshi Okubo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 160 days.

(21) Appl. No.: 14/353,169

(22) PCT Filed: Nov. 22, 2012

(86) PCT No.: PCT/JP2012/080328
§ 371 (c)(1),
(2) Date: Apr. 21, 2014

(87) PCT Pub. No.: WO2013/077410
PCT Pub. Date: May 30, 2013

(65) Prior Publication Data
US 2014/0305124 A1    Oct. 16, 2014

(30) Foreign Application Priority Data
Nov. 25, 2011   (JP) ................................ 2011-257882

(51) Int. Cl.
*F03G 6/04* (2006.01)
*F24J 2/07* (2006.01)
(Continued)

(52) U.S. Cl.
CPC .............. *F03G 6/04* (2013.01); *F03G 6/064* (2013.01); *F24J 2/07* (2013.01); *F24J 2/245* (2013.01);
(Continued)

(58) Field of Classification Search
CPC .... F03G 6/04; F03G 6/064; F24J 2/245; F24J 2/07; F24J 2/4647; Y02E 10/44; Y02E 10/41; Y02E 10/46
(Continued)

(56) References Cited

U.S. PATENT DOCUMENTS 2,632,997 A    3/1953   Howard et al.
3,171,403 A    3/1965   Drescher
(Continued)

FOREIGN PATENT DOCUMENTS

AU      691792 B2     6/1994
EP      1746363 A2    1/2007
(Continued)

OTHER PUBLICATIONS

Tanaka, R. et al., "Development of Gas Turbine Starting System with Large Scale Voltage Source Inverter," Mitsubishi Heavy Industries, Ltd., Technical Report, 1996, p. 396-399, vol. 33, No. 6.
(Continued)

*Primary Examiner* — Jason Newton
(74) *Attorney, Agent, or Firm* — Manabu Kanesaka; Benjamin Hauptman; Kenneth Berner

(57) ABSTRACT

A solar heat receiver includes a casing having an aperture, and a piping system provided in the casing and discharging a heat medium, which is sent from a fluid supply source, to a fluid supply destination after the heat medium is heated by the solar light. The piping system includes: heat receiver tubes that heat the heat medium flowing therein; an inlet header tube that distributes the heat medium, which is introduced from the fluid supply source, to each of the heat receiver tubes, and an outlet header tube that collects the heat medium passing through each of the heat receiver tubes, and leads the heat medium to the fluid supply destination.

(Continued)

The inlet header tube and the outlet header tube have a larger inner diameter than each of the heat receiver tubes.

7 Claims, 5 Drawing Sheets

(51) Int. Cl.
    *F24J 2/46*            (2006.01)
    *F24J 2/24*            (2006.01)
    *F03G 6/06*           (2006.01)

(52) U.S. Cl.
    CPC ............. *F24J 2/4647* (2013.01); *Y02E 10/41* (2013.01); *Y02E 10/44* (2013.01); *Y02E 10/46* (2013.01)

(58) Field of Classification Search
    USPC ...................................................... 60/641.11
    See application file for complete search history.

(56) References Cited

U.S. PATENT DOCUMENTS

| | | | |
|---|---|---|---|
| 3,892,433 | A | 7/1975 | Blake |
| 3,995,429 | A | 12/1976 | Peters et al. |
| 4,044,753 | A | 8/1977 | Fletcher et al. |
| 4,093,024 | A * | 6/1978 | Middleton ............... F24J 2/205 126/666 |
| 4,139,286 | A | 2/1979 | Hein et al. |
| 4,164,123 | A | 8/1979 | Smith |
| 4,309,987 | A * | 1/1982 | Higgins, Jr. ............. F24J 2/242 126/664 |
| 4,313,304 | A | 2/1982 | Hunt |
| 4,683,715 | A | 8/1987 | Iizuka et al. |
| 4,815,443 | A | 3/1989 | Vrolyk et al. |
| 5,323,764 | A | 6/1994 | Karni et al. |
| 6,668,555 | B1 * | 12/2003 | Moriarty ................... F03G 6/00 126/635 |
| 6,931,856 | B2 | 8/2005 | Belokon et al. |
| 2003/0026536 | A1 | 2/2003 | Ho |
| 2004/0004175 | A1 | 1/2004 | Nakamura |
| 2004/0112374 | A1 | 6/2004 | Litwin |
| 2006/0016448 | A1 | 1/2006 | Ho |
| 2008/0087276 | A1 | 4/2008 | Zhao |
| 2008/0258473 | A1 | 10/2008 | McMaster |
| 2008/0289334 | A1 | 11/2008 | Orosz et al. |
| 2009/0173337 | A1 * | 7/2009 | Tamaura ................... F02C 1/05 126/634 |
| 2009/0217921 | A1 | 9/2009 | Gilon et al. |
| 2009/0241939 | A1 | 10/2009 | Heap et al. |
| 2010/0154781 | A1 * | 6/2010 | Zhang ..................... F01K 23/10 126/609 |
| 2010/0242949 | A1 * | 9/2010 | Kawashima ............... F24J 2/07 126/600 |
| 2011/0036107 | A1 * | 2/2011 | Muir ................. H05K 7/20827 62/89 |
| 2012/0031094 | A1 | 2/2012 | de Bruijn et al. |
| 2012/0180483 | A1 * | 7/2012 | Kobayashi ................ F03G 6/04 60/641.11 |
| 2012/0227731 | A1 * | 9/2012 | Tamaura ............ G02B 19/0042 126/664 |
| 2012/0234312 | A1 * | 9/2012 | Nakatani ................... F03G 6/00 126/651 |
| 2012/0291772 | A1 * | 11/2012 | Atarashiya ................ F24J 2/07 126/663 |
| 2012/0292004 | A1 * | 11/2012 | Chen ........................ F24J 2/245 165/175 |
| 2012/0312296 | A1 * | 12/2012 | Morse ....................... F24J 2/07 126/680 |
| 2013/0192586 | A1 * | 8/2013 | Wasyluk ................. F22B 1/006 126/619 |
| 2015/0192327 | A1 * | 7/2015 | Marumoto ............... F24J 2/265 126/600 |

FOREIGN PATENT DOCUMENTS

| | | |
|---|---|---|
| JP | S50-076447 A | 6/1975 |
| JP | S57-117744 A | 7/1982 |
| JP | S57-157073 A | 9/1982 |
| JP | S58-024758 A | 2/1983 |
| JP | S58-128475 A | 8/1983 |
| JP | S58-128476 A | 8/1983 |
| JP | S61-142335 A | 6/1986 |
| JP | H02-030988 A | 2/1990 |
| JP | H03-046671 B2 | 7/1991 |
| JP | H04-113191 A | 4/1992 |
| JP | H05-202840 A | 8/1993 |
| JP | H06-037574 U | 5/1994 |
| JP | H06-307257 A | 11/1994 |
| JP | H07-004752 A | 1/1995 |
| JP | H08-331889 A | 12/1996 |
| JP | H09-103766 A | 4/1997 |
| JP | 2951297 B | 9/1999 |
| JP | H11-280638 A | 10/1999 |
| JP | 2001-020850 A | 1/2001 |
| JP | 2004-037037 A | 2/2004 |
| JP | 2004-324629 A | 11/2004 |
| JP | 2006-010292 A | 1/2006 |
| JP | 2007-071103 A | 3/2007 |
| JP | 2007-071104 A | 3/2007 |
| JP | 2007-524055 A | 8/2007 |
| JP | 2008-261449 A | 10/2008 |
| JP | 2008-541196 A | 11/2008 |
| JP | 2009-077498 A | 4/2009 |
| JP | 2009-109154 A | 5/2009 |
| JP | 2009-131045 A | 6/2009 |
| JP | 2010-133594 A | 6/2010 |
| JP | 2010-236699 A | 10/2010 |
| JP | 2011-007149 A | 1/2011 |
| JP | 2011-007150 A | 1/2011 |
| JP | 2011-007458 A | 1/2011 |
| JP | 2011-007459 A | 1/2011 |
| JP | 2011-032902 A | 2/2011 |
| WO | 97/47866 A1 | 12/1997 |
| WO | 2006/025449 A1 | 3/2006 |
| WO | 2007/073008 A2 | 6/2007 |
| WO | 2008/153922 A1 | 12/2008 |
| WO | 2009/027986 A2 | 3/2009 |

OTHER PUBLICATIONS

Uhlig, R. et al., "BMU Projekt Co-MINIT, AP2," Statusseminar Solarturm-Technologie, DLR Stuttgart, Nov. 10, 2005.
Heller, P. et al., "Development Status of Solar-hybrid Gas Turbine System for Cogeneration and Combined Cycle Process," German Aerospace Center (DLR), Jun. 24, 2008.
"CSP Technologies Overview", Concentrating Solar Power and Sun Lab, retrieved on Jun. 29, 2009.
PCT/ISA/210, "International Search Report for International Application No. PCT/JP2009/064473," dated Nov. 24, 2009.
PCT/ISA/237, "Written Opinion of the International Searching Authority for International Application No. PCT/JP2009/064473," dated Nov. 24, 2009.
Japan Patent Office, "Office Action for JP 2009-153707," dated May 21, 2013.
Japan Patent Office, "Office Action for JP 2009-153704," dated Nov. 19, 2013.
Japan Patent Office, "Office Action for JP 2009-153705," dated Dec. 10, 2013.
Japan Patent Office, "Office Action for JP 2009-153076," dated Dec. 10, 2013.
Japan Patent Office, "Office Action for JP 2009-178283," dated Dec. 10, 2013.
Japan Patent Office, "Office Action for JP 2009-178284," dated Dec. 10, 2013.
Japan Patent Office, "Decision of Rejection for JP 2009-178285," dated Dec. 10, 2013.
United States Patent and Trademark Office, "Office Action for U.S. Appl. No. 13/141,640," dated Apr. 16, 2014.

(56) References Cited

OTHER PUBLICATIONS

United States Patent and Trademark Office, "Office Action for U.S. Appl. No. 13/141,640," dated Oct. 24, 2014.
United States Patent and Trademark Office, "Office Action for U.S. Appl. No. 13/141,640," dated Apr. 23, 2015.
PCT, "International Search Report for PCT/JP2012/080328," dated Dec. 18, 2012.
PCT, "Written Opinion for PCT/JP2012/080328," dated Dec. 18, 2012.
Kawasaki Thermal Engineering Co., Ltd, "Principle of the exhaust heat recovery boiler," Product Information, 2010.

\* cited by examiner

SOLAR HEAT RECEIVER AND SOLAR HEAT POWER GENERATION DEVICE

TECHNICAL FIELD

The present invention relates to a solar heat receiver and a solar heat power generation device.

Priority is claimed on Japanese Patent Application No. 2011-257882, filed on Nov. 25, 2011, the content of which is incorporated herein by reference.

BACKGROUND ART

Recently devices using heat energy obtained by collecting solar light as clean energy that does not affect an environment have been introduced. As such devices, solar heat power generation devices performing power generation by converting the heat energy obtained by collecting the solar light into electric energy have been developed (e.g., see Patent Document 1).

In the solar heat power generation devices described above, light and heat are typically collected by a combination of a light collecting unit using a mirror and a solar heat receiver. Such a combination system of the light collecting unit and the heat receiver generally includes two types of systems called a trough light collecting system and a tower light collecting system.

The trough light collecting system refers to a system for causing solar light to be reflected by a semicylindrical mirror (trough), collecting the solar light and its heat on a tube passing through the center of the cylinder, and heating a heat medium flowing in the tube. However, in the trough light collecting system, since the mirror changes its direction to track the solar light under uniaxial control, it cannot expect the heat medium to be heated to a high temperature.

In contrast, the tower light collecting system refers to a system for disposing the solar heat receiver on a part of a tower erected from the ground, arranging a plurality of reflected light control mirrors, each of which is used for light collection and is called a heliostat, so as to surround the part of the tower, guiding the solar light reflected by the heliostats to the solar heat receiver, and thereby collecting the solar light and its heat. In recent years, from the viewpoint of achieving much higher efficiency of a power generation cycle, the solar heat power generation devices based on the tower light collecting system for allowing the heat medium heat-exchanged by the solar heat receiver to be heated to a higher temperature have been actively developed.

The solar heat receiver used in the tower light collecting system, as disclosed in, for instance, Patent Document 2, is equipped with a casing having an aperture through which solar light enters, and a piping system that is provided in the casing and discharges a heat medium, which is sent from an external fluid supply source, to an external fluid supply destination after the heat medium is heated by the solar light. The piping system includes: a plurality of heat receiver tubes that are housed in the casing and receive the solar light, which enters through the aperture of the casing, to heat the heat medium flowing inside the heat receiver tubes; an inlet header tube that is connected to one end side of each of the heat receiver tubes and distributes the heat medium, which is introduced from the fluid supply source, to each of the heat receiver tubes; and an outlet header tube that is connected to the other end side of each of the heat receiver tubes, collects the heat medium passing through each of the heat receiver tubes, and leads the heat medium to the fluid supply destination.

PRIOR ART DOCUMENT

Patent Document

Patent Document 1: Japanese Unexamined Patent Application, First Publication No. H11-280638
Patent Document 2: United States Patent Application, Publication No. 2009/0241939

SUMMARY OF INVENTION

Problem to be Solved by the Invention

Incidentally, in the piping system, paths along which the heat medium flows from an inlet of the inlet header tube to an outlet of the outlet header tube are present in a number corresponding to the heat receiver tubes.

However, in the related art, since loss of energy of the heat medium differs in every path, a flow rate of the heat medium flowing through each path is not uniformly distributed. As a result, local variation in temperature may occur at some of the plurality of paths, or a difference in heating performance for the heat medium of each path may occur.

The present invention has been made in consideration of such circumstances, and an object of the present invention is to uniformize temperature distribution of a plurality of paths and heating performance for a heat medium of each path.

Means for Solving the Problem

To accomplish the above object, the present invention employs the following means.

In detail, a solar heat receiver according to the present invention includes a casing having an aperture configured to let solar light to enter, and a piping system installed in the casing and configured to discharge a heat medium, which is sent from a fluid supply source of an outside, to a fluid supply destination of the outside after the heat medium is heated by the solar light. The piping system includes: a plurality of heat receiver tubes housed in the casing and configured to receive the solar light entering through the aperture of the casing and to heat the heat medium flowing therein; an inlet header tube connected to one end side of each of the heat receiver tubes and configured to distribute the heat medium, which is introduced from the fluid supply source, to each of the heat receiver tubes; and an outlet header tube connected to the other end side of each of the heat receiver tubes and configured to collect the heat medium passing through each of the heat receiver tubes and to lead the collected heat medium to the fluid supply destination. The inlet header tube and the outlet header tube have a larger inner diameter than the heat receiver tubes.

With this constitution, energy loss of the heat medium in the inlet and outlet header tubes (hereinafter referred to as "header tubes") whose inner diameters are increased is smaller than that in the heat receiver tubes. For this reason, a ratio of the energy loss in the header tubes to the sum of the energy loss on each path is relatively reduced, whereas a ratio of the energy loss in the heat receiver tubes to the sum of the energy loss on the paths is relatively increased.

In other words, since the energy loss is suppressed in the header tubes whose paths have different lengths, a difference in the sum of the energy loss on each path is also reduced.

Thus, it is possible to reduce a difference in a flow rate of the heat medium flowing along each path, and uniformize flow rate distribution of each path. Accordingly, it is possible to uniformize temperature distribution of a plurality of paths and heating performance for the heat medium of each path.

Further, the outlet header tube may be set to have a larger inner diameter than the inlet header tube.

With this constitution, since the outlet header tube is set to have a larger inner diameter than the inlet header tube, a flow speed of the heat medium is inhibited from being increased in the outlet header tube through which the heat medium heated by the heat receiver tubes and whose volume flow rate is increased flows. Thereby, the energy loss proportional to the flow speed of the heat medium can also be suppressed. Accordingly, it is possible to further reduce the difference in the flow rate of the heat medium flowing along each path, and further uniformize the flow rate distribution.

Further, at least one of the inlet and outlet header tubes may include a plurality of flow ports, through which the heat medium is caused to flow and which are installed between the outside and the at least one of the inlet and outlet header tubes.

With this constitution, since at least one of the inlet and outlet header tubes is provided with a plurality of flow ports, an average distance from an aperture of each heat receiver tube to the flow port closest to the corresponding aperture of the heat receiver tube can be reduced. Thereby, it is possible to suppress the energy loss generated between the flow port and the aperture of the heat receiver tube, and reduce the difference in the flow rate of the heat medium flowing along each path. Thus, the flow rate distribution to each path can be uniformized.

The flow ports are preferably provided away from each other in a direction in which the heat receiver tubes are arranged.

Further, the heat medium may be air.

With this constitution, since the heat medium is air, it is possible to uniformly heat the air.

Further, a solar heat power generation device according to the present invention includes: the solar heat receiver set forth in any one of the above constitutions; a tower erected on a ground and configured to fixedly install the solar heat receiver at a high position; a plurality of heliostats disposed around the tower within a predetermined angular range and each configured to cause the solar light to enter through the aperture of the solar heat receiver; and a gas turbine unit including a compressor acting as the fluid supply source, a turbine acting as the fluid supply destination, and an electric generator configured to be driven rotatably by the turbine.

With this constitution, the solar heat power generation device includes the aforementioned solar heat receiver of the present invention. For this reason, temperature distribution of a plurality of paths and heating performance for the heat medium of each path are uniformized. As such, the solar heat power generation device can be configured as a system having high durability.

Advantageous Effects of Invention

In the solar heat receiver according to the present invention, temperature distribution of a plurality of paths and heating performance for the heat medium of each path can be uniformized.

Further, in the solar heat power generation device according to the present invention, temperature distribution of a plurality of paths and heating performance for the heat medium of each path are uniformized. As such, the solar heat power generation device can be configured as a system having excellent durability.

DESCRIPTION OF EMBODIMENTS

Hereinafter, an embodiment of the present invention will be described with reference to the accompanying drawings.

In the following description, a solar heat power generation device in which solar heat receiver of the present invention and a gas turbine unit generating electricity using a heat medium to which heat is applied by the solar heat receiver are integrally configured will be given as an example.

[Solar Heat Power Generation Device]

Figure 1:
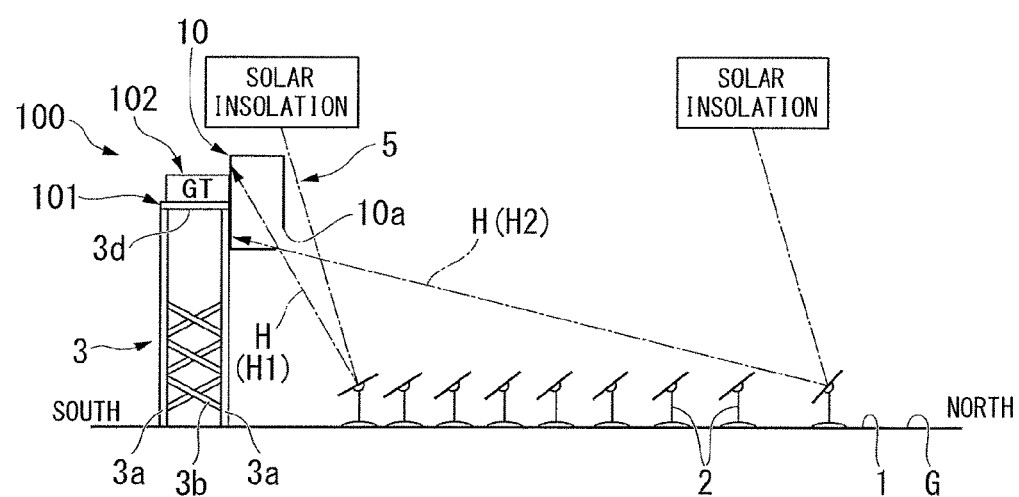
FIG. 1 is a side view of a solar heat power generation device 100 according to an embodiment of the present invention.

FIG. 1 is a side view of a solar heat power generation device 100 according to an embodiment of the present invention.

Here, a place suitable for the location of the solar heat power generation device on the Earth is an arid area of a subtropical high-pressure belt that is strong in insolation directly received from the sun and is quite close to the tropics. For example, the solar heat power generation device of the present embodiment employs a unilateral arrangement system in which it is disposed, particularly, on a high-latitude area within the subtropical high-pressure belt. Note that the present embodiment is not limited to the unilateral arrangement system.

In FIG. 1, a reference number 1 indicates a heliostat field that is installed on the ground G and is herein described as an area of the northern hemisphere. The solar heat power generation device 100 includes a light-collecting heat-receiving system 101 that collects solar light H (e.g., H1 and H2 of FIG. 1) radiated onto the heliostat field 1 and receives heat from the solar light H, and a gas turbine unit 102 that generates electricity using air A (a heat medium) to which the heat received by the light-collecting heat-receiving system 101 is applied.

Here, although not described in detail, the gas turbine unit 102 is mainly equipped with a compressor compressing the air A (working fluid) to which heat is applied by the light-collecting heat-receiving system 101, a turbine supplied with the air A compressed by the compressor, a rotor connecting the compressor and the turbine on the same shaft, and an electric generator connected to the rotor. Thus, as the rotor is rotated by the air A supplied to the turbine, the air A is compressed by the compressor, and electricity can be generated by the electric generator.

The light-collecting heat-receiving system 101 is equipped with a plurality of heliostats 2 disposed on the heliostat field 1 in order to reflect the solar light H (H1 and H2), a tower 3 erected on the ground G, and a solar heat receiver 5 that is installed on an upper portion of the tower 3 and receives the solar light H. In the present embodiment, for example, the tower 3 is disposed on one end side (southern end in a north-south direction) of the heliostat field 1. Further, the heliostats 2 are located on the other end side (north side) in the heliostat field 1, and are arranged on a region of a predetermined angular range centering on the tower 3 within an approximate horizontal plane. In other words, the heliostat field 1 is set in a sector shape centering on the tower 3. When the heliostat field 1 is located in an area of the southern hemisphere, an arrangement relation between the tower 3 and the heliostats 2 is opposite to that in the case of the aforementioned northern hemisphere.

The tower 3 includes a plurality of (e.g., four) supporting columns 3*a* erected upward from the ground G, and beam sections 3*b* connected to the supporting columns 3*a* so as to he bridged between the supporting columns 3*a*. Further, the upper portion of the tower 3 is provided with a frame 3*d* supporting the solar heat receiver 5 described above.

[Solar Heat Receiver]

Figure 2:
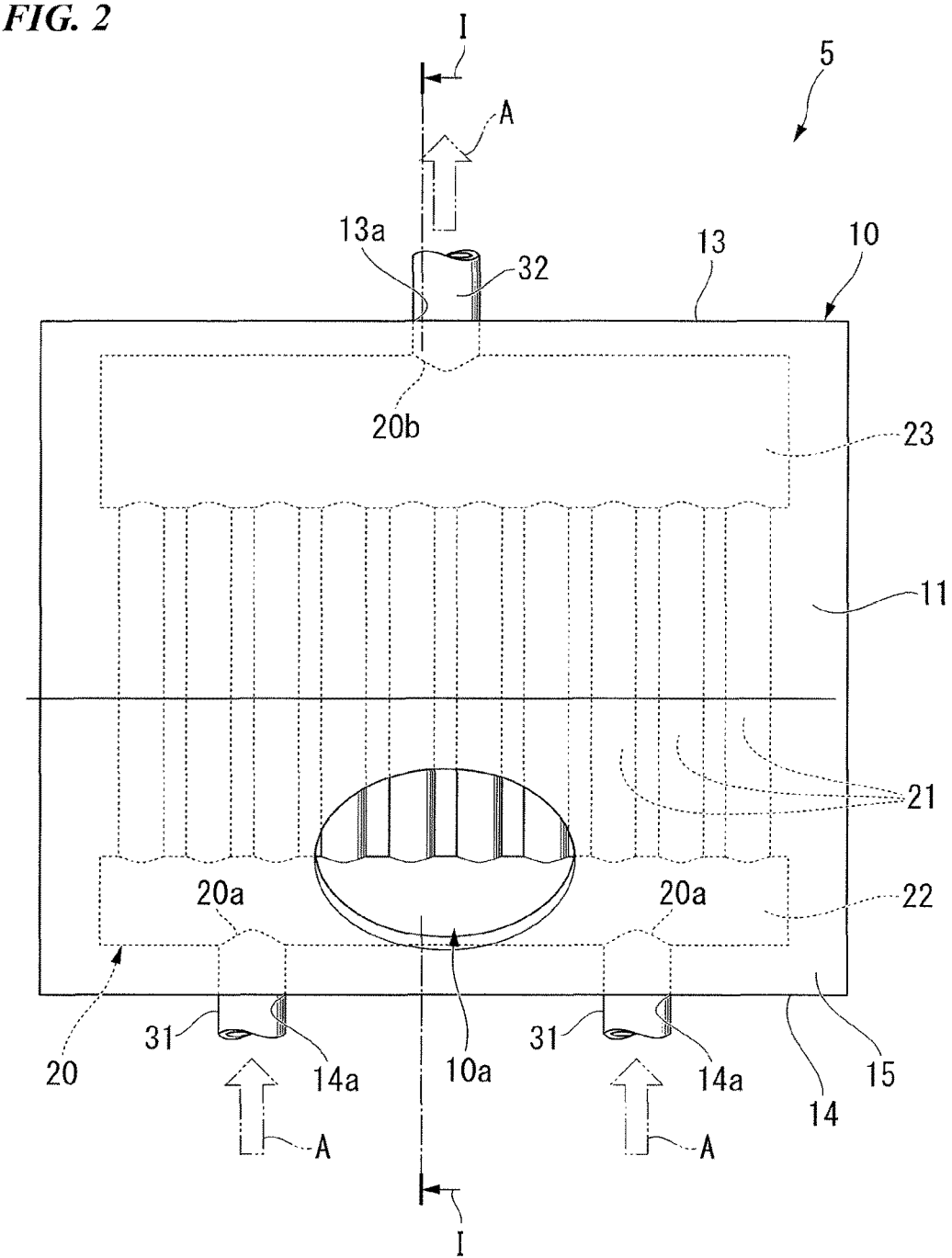
FIG. 2 is a schematic front view of a solar heat receiver 5 according to an embodiment of the present invention.
Figure 3:
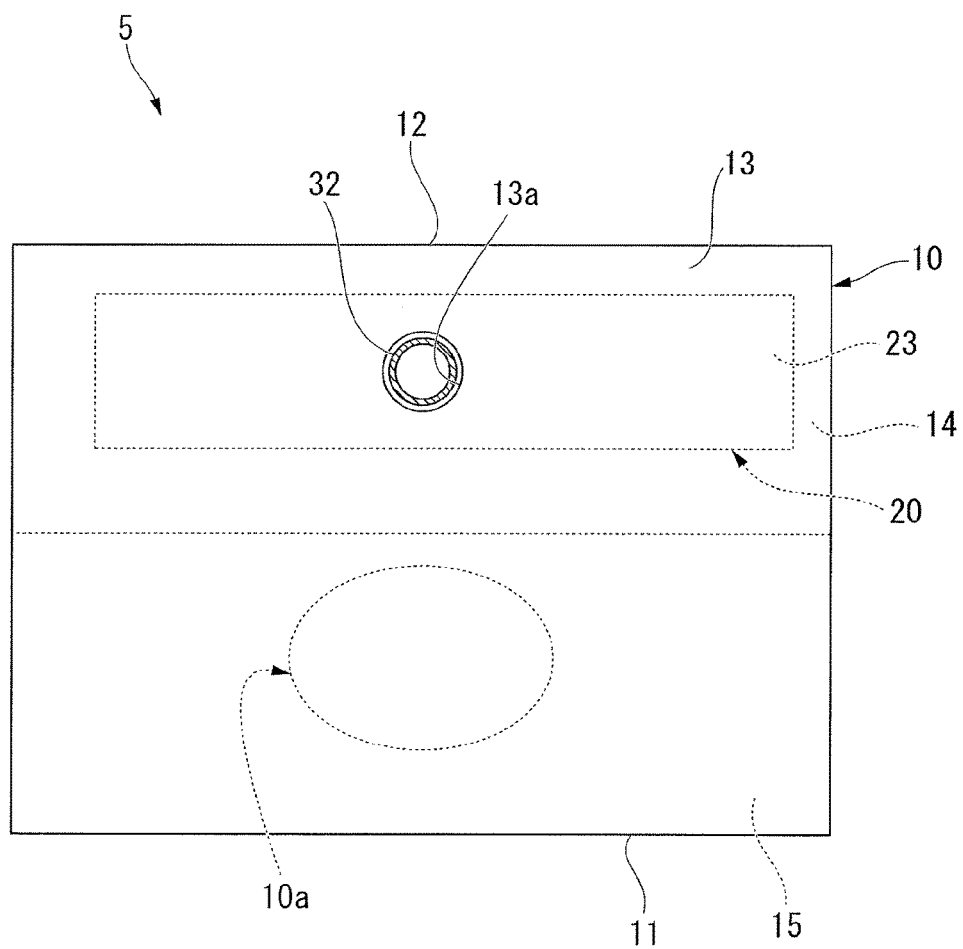
FIG. 3 is a schematic top view of the solar heat receiver 5 according to the embodiment of the present invention.
Figure 4:
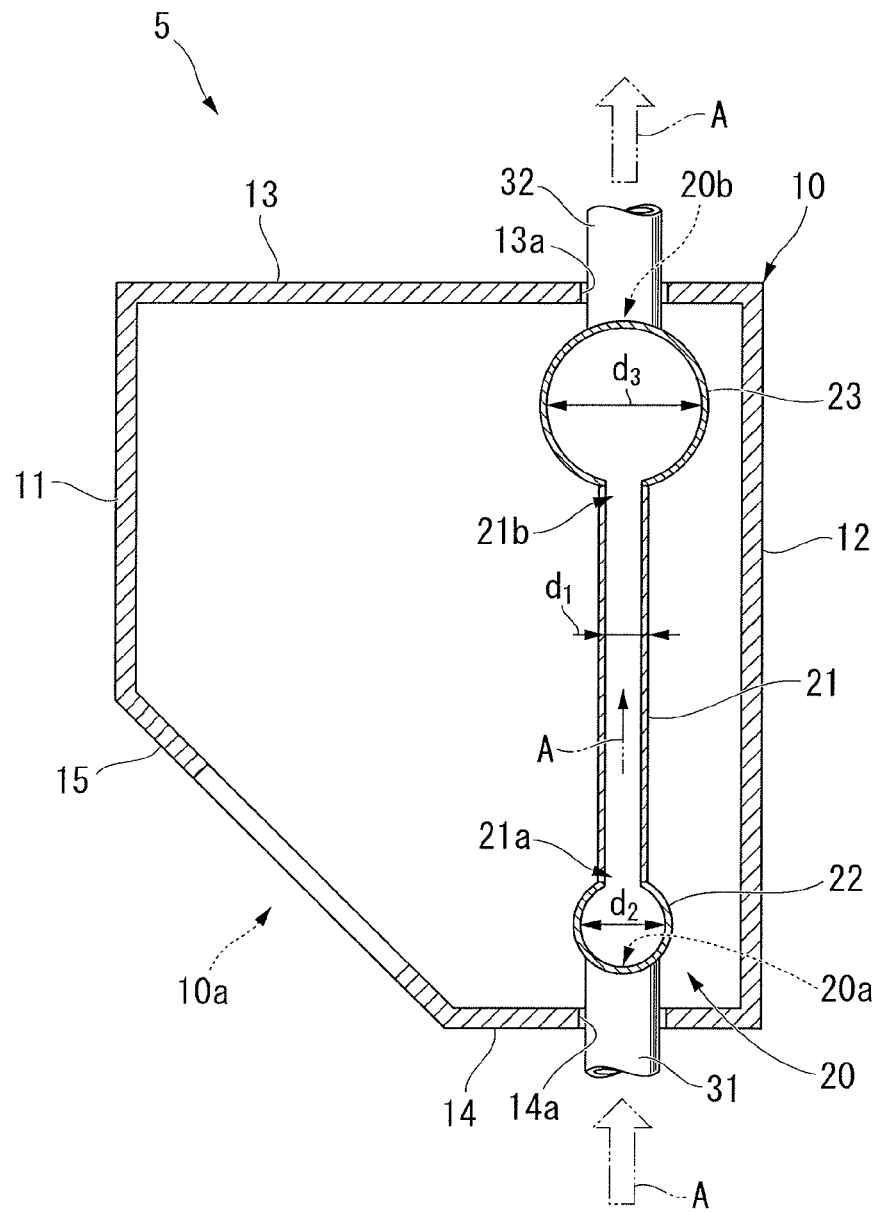
FIG. 4 is a schematic side cross-sectional view of the solar heat receiver 5 according to the embodiment of the present invention, i.e. a cross-sectional view taken along line I-I of FIG. 2.

FIG. 2 is a schematic front view of the solar heat receiver 5. FIG. 3 is a schematic top view of the solar heat receiver 5. FIG. 4 is a schematic side cross-sectional view of the solar heat receiver 5 (i.e., a cross-sectional view taken along line I-I of FIG. 2). In the following description, an upstream side (north side in the present embodiment) in a radiating direction of the solar light H will be defined as a front side, and a downstream side (south side in the present embodiment) will be defined as a rear side.

As shown in FIGS. 2 to 4, the solar heat receiver 5 includes a casing 10 having an aperture 10*a* through which the solar light H enters, and a piping system 20 that is set up in the casing 10 and discharges air A, which is sent from the compressor (fluid supply source) of the gas turbine unit 102, to the turbine (fluid supply destination) of the gas turbine unit 102 after the air A is heated by the solar light H.

As shown in FIGS. 2 to 4, the casing 10 is formed in a box shape, and has a shape in which the lower half of a front portion thereof is inclinedly cut out. To be more specific, a front wall 11 is suspended from a top wall 13 by nearly half a length of a rear wall 12, and a bottom wall 14 extends forward from the rear wall 12 by nearly half a length of the top wall 13. A lower end edge of the front wall 11 and a front end edge of the bottom wall 14 are connected by an inclined wall 15.

The inclined wall 15 is provided with an aperture 10*a* that is open to the ground G. To be specific, the aperture 10*a* is open so that an aperture direction thereof is obliquely directed toward a front lower side, and is configured so that the solar light H reflected by the heliostats 2 is introduced into the casing 10 through the aperture 10*a*. A heat insulator (not shown) is provided throughout an inner surface of the casing 10. Thereby, heat energy inside the casing 10 is inhibited from being radiated outward from a wall of the casing 10.

A middle portion of the rear wall 12 is connected to the frame 3*d* of the aforementioned tower 3. Thereby, the casing 10 is supported on the tower 3.

As shown in FIG. 2, the piping system 20 has a plurality of heat receiver tubes 21, an inlet header tube 22, and an outlet header tube 23.

The plurality of heat receiver tubes 21 are housed in the casing 10, and are arranged in a row along an inner surface of the rear wall 12 away from one another at predetermined pitches with an extending direction thereof directed in a vertical direction. Each heat receiver tube 21 has a lower end (one end) connected to the inlet header tube 22 and an upper end (the other end) connected to the outlet header tube 23.

The heat receiver tubes 21 heat the air A flowing therein by tube walls to which heat is applied by receiving the solar light H entering through the aperture 10*a*.

The upstream ends (lower ends) of the plurality of heat receiver tubes 21 in a flowing direction of the air A are all connected to the inlet header tube 22, and the inlet header tube 22 distributes the air A introduced from the compressor of the gas turbine unit 102 to each heat receiver tube 21.

The inlet header tube 22 is a tube which extends along the inner surface of the rear wall 12 in a direction in which the heat receiver tubes 21 are arranged at an inner lower portion of the casing 10 and in the extending direction of which both ends thereof are closed. Both end sides of the inlet header tube 22 are provided with respective inlets (flow parts) 20*a* of fluid supply passages 31 one by one.

Each fluid supply passage 31 extends downward from the inlet header tube 22, is loosely inserted into a through-hole 14*a* (see FIG. 4) formed in the bottom wall 14 of the casing 10, and is pulled out of the casing 10. Then, upstream ends of the fluid supply passages 31 are connected to the compressor of the gas turbine unit 102 described above, and are supplied with the air A from the compressor. A seal member, which seals each fluid supply passage 31 and the casing 10 to enable relative displacement, may be provided between each fluid supply passage 31 and each through-hole 14*a*.

The downstream ends (upper ends) of the plurality of heat receiver tubes 21 in the flowing direction of the air A are all connected to the outlet header tube 23, and the outlet header tube 23 collects the air A flowing through each heat receiver tube 21 and leads the collected air A to the gas turbine unit 102.

The outlet header tube 23 is a tube which extends along the inner surface of the rear wall 12 in the direction in which the heat receiver tubes 21 are arranged at an inner upper portion of the casing 10 and in the extending direction of which both ends thereof are closed. The middle of the outlet header tube 23 in the extending direction is provided with an outlet (flow part) 20*b* of a fluid discharge passage 32.

The fluid discharge passage 32 extends upward from the outlet header tube 23, is loosely inserted into a through-hole 13*a* (see FIG. 4) formed in the top wall 13 of the casing 10, and is pulled out of the casing 10. Then, a downstream side of the fluid discharge passage 32 is connected to the turbine described above. The air A to which heat is applied by the heat receiver tubes 21 is supplied to the turbine through the fluid discharge passage 32. A seal member, which seals the fluid discharge passage 32 and the casing 10 to enable relative displacement, may be provided between the fluid discharge passage 32 and the through-hole 13*a*.

As shown in FIG. 4, the piping system 20 is configured so that, in comparison with an inner diameter $d_1$ of each heat receiver tube 21, an inner diameter $d_2$ of the inlet header tube 22 and an inner diameter $d_3$ of the outlet header tube 23 are set to be larger. Further, in comparison with the inner diameter $d_2$ of the inlet header tube 22, the inner diameter $d_3$ of the outlet header tube 23 is set to be larger.

Figure 5:
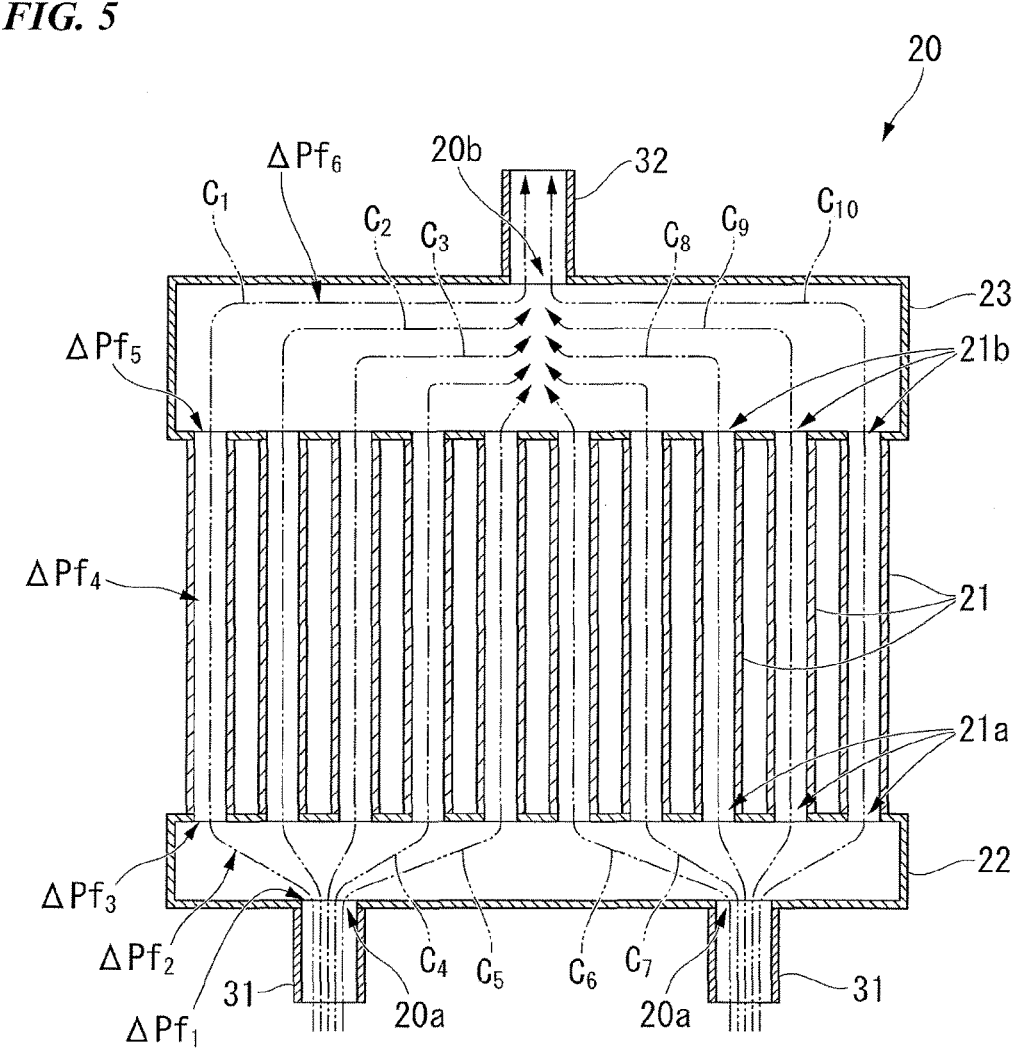
FIG. 5 is a cross-sectional view of a piping system 20 according to an embodiment of the present invention, and shows each of paths C ($C_1$, $C_2$, $C_3$ ... $C_n$).

In the piping system 20, paths C along which the air A flows from the two inlets 20*a* of the inlet header tube 22 to the outlet 20*b* of the outlet header tube 23 are formed in the respective heat receiver tubes 21 (see FIG. 5).

Here, pressure loss $\Delta P_f$ of a conduit is generally obtained by Expression (1) below.

$$\Delta P_f = 4f(\rho u^2/2)\cdot(L/D) \qquad \text{Expression (1)}$$

where f is a tube friction coefficient, ρ is a density of a fluid, u is an average speed of the fluid, L is an overall length of the conduit, and D is an inner diameter. Further, with regard to the tube friction coefficient f, for example, the Swamee-Jain equation may be used.

Next, an operation of the aforementioned solar heat receiver 5 will be described.

First, when the air A is sent from the compressor of the gas turbine unit 102 to the piping system 20 via the fluid supply passages 31, the air A from the two inlets 20a is introduced into the inlet header tube 22. The air A introduced into the inlet header tube 22 is distributed to each heat receiver tube 21, and flows to any of the heat receiver tubes 21. The air A is heated by the tube walls to which heat is applied by the solar light H while the air A flows inside the heat receiver tubes 21. Then, the air A heated by passing through the heat receiver tubes 21 is collected by the outlet header tube 23, and is led to the turbine of the gas turbine unit 102.

In this case, in comparison with the inner diameter $d_1$ of the heat receiver tube 21, the inner diameter $d_2$ of the inlet header tube 22 and the inner diameter $d_3$ of the outlet header tube 23 are set to be larger. As such, in each path C, the air A per unit length passes relatively smoothly through the inlet header tube 22 and the outlet header tube 23, compared to the heat receiver tubes 21.

Further, when passing through the heat receiver tubes 21, the air A is subjected to thermal expansion due to the heating, and thereby a volume flow rate thereof increases. For this reason, the volume flow rate of the air A passing through the outlet header tube 23 increases, compared to the heat receiver tubes 21 and the inlet header tube 22. However, since the inner diameter $d_3$ of the outlet header tube 23 is set to be larger than the inner diameter $d_1$ of the heat receiver tube 21 and the inner diameter $d_2$ of the inlet header tube 22, the air A passes smoothly through the outlet header tube 23.

As described above, according to the solar heat receiver 5, the air A passes smoothly through the inlet header tube 22 and the outlet header tube 23.

To be more specific, lengths of the paths C are different in each of the inlet header tube 22 and the outlet header tube 23 (see FIG. 5). In other words, depending on an arrangement position of the heat receiver tube 21 of each path C, a distance from an inlet 21a of each heat receiver tube 21 to the inlet 20a adjacent to the corresponding inlet 21a and a distance from an outlet 21b of each heat receiver tube 21 to the outlet 20b adjacent to the corresponding outlet 21b are different from each other. For this reason, in comparison with the heat receiver tubes 21 whose lengths are the same in the paths C, the inlet header tube 22 and the outlet header tube 23 easily influence a variation in energy loss between the paths C (see Expression (1)). In other words, when the inner diameters d are reduced in the inlet header tube 22 and the outlet header tube 23, a flow speed of the air A is increased. As such, as the heat receiver tubes 21 become distant from the inlet 20a and the outlet 20b, the energy loss shows a tendency to increase.

However, in the solar heat receiver 5, the inner diameters $d_2$ and $d_3$ are set to be larger than the inner diameter $d_1$. For this reason, a ratio of the energy loss ($\Delta Pf_2$ and $\Delta Pf_6$ to be described below) in the inlet header tube 22 and the outlet header tube 23 to the sum of the energy loss on each path C is smaller than that in the heat receiver tubes 21, whereas a ratio of the energy loss ($\Delta Pf_4$ to be described below) in the heat receiver tubes 21 to the sum of the energy loss is larger than those in the inlet header tube 22 and the outlet header tube 23. In other words, since the energy loss is suppressed in the inlet header tube 22 and the outlet header tube 23 having different lengths on each path C, a difference in the sum of the energy loss on each path C is also reduced. Accordingly, it is possible to reduce a difference in the flow rate of the air A flowing along each path C, and uniformize distribution of the flow rate between the paths C. Thus, it is possible to uniformize temperature distribution of the plurality of paths C and heating performance for the air A of each path C.

Further, the inner diameter $d_3$ of the outlet header tube 23 is set to be larger than the inner diameter $d_1$ of the heat receiver tube 21 and the inner diameter $d_2$ of the inlet header tube 22. As such, even when the air A whose volume flow rate is increased flows to the outlet header tube 23, the flow speed of the air A is inhibited from being increased. Thereby, the energy loss proportional to the flow speed of the air A can also be suppressed. Accordingly, it is possible to further reduce the difference in the flow rate of the air A flowing along each path C, and further uniformize the flow rate distribution to each path C.

Further, since the two inlets 20a are provided for the inlet header tube 22, an average distance from the inlet 21a of each heat receiver tube 21 to the inlet 20a closest to the corresponding inlet 21a can be reduced. Thereby, it is possible to suppress the energy loss ($\Delta Pf_2$ to be described below) generated between the inlet 20a and the inlet 21a of the heat receiver tube 21, and reduce the difference in the flow rate of the air A flowing along each path C. Thus, the flow rate distribution can be uniformized.

Further, according to the aforementioned solar heat power generation device 100, since the solar heat receiver 5 is provided, the temperature distribution of the plurality of paths C and the heating performance for the air A of each path C are uniformized. As such, the solar heat power generation device 100 can be configured as a system having high durability.

In the aforementioned embodiment, the inner diameters are set as the inner diameter $d_3$>the inner diameter $d_2$>the inner diameter $d_1$. However, the inner diameters d ($d_1$, $d_2$, $d_3$) are set in the following method, and thereby the energy loss between the paths C can be further uniformized.

That is to say, as shown in FIG. 5, the energy loss $\Delta f_i$ of the path C is mainly the sum $\Sigma \Delta Pf_i$ of discharge loss (=$\Delta Pf_1$) of the inlet 20a, friction loss (=$\Delta Pf_2$) from the inlet 20a to the inlet 21a of the heat receiver tube 21, suction loss (=$\Delta Pf_3$) to the inlet 21a of the heat receiver tube 21, friction loss (=$\Delta Pf_4$) in the heat receiver tube 21, discharge loss (=$\Delta Pf_5$) from the outlet 21b of the heat receiver tube 21, and friction loss (=$\Delta Pf_6$) from the outlet 21b of the heat receiver tube 21 to the outlet 20b.

For this reason, $\Delta Pf_i$ is integrated with respect to each of the paths $C_1, C_2, C_3 \ldots C_n$. That is, $\Sigma \Delta Pf_i$ (=$P_{C1}$) of the path $C_1$, $\Sigma \Delta Pf_i$ (=$P_{C2}$) of the path $C_2$, $\Sigma \Delta Pf_i$ (=$P_{C3}$) of the path $C_3 \ldots \Sigma \Delta Pf_i$ (=$P_{Cn}$) of the path $C_n$ are obtained.

As described above, when the inner diameter $d_2$ of the inlet header tube 22 and the inner diameter $d_3$ of the outlet header tube 23 are the same level as the inner diameter $d_1$ of the heat receiver tube 21, the friction loss (=$\Delta Pf_2$) from the inlet 20a to the heat receiver tube 21, the suction loss (=$\Delta Pf_3$) to the inlet 21a of the heat receiver tube 21, and the discharge loss (=$\Delta Pf_5$) to the outlet 21b of the heat receiver tube 21 are increased, and differences of $P_{C1}, P_{C2}, P_{C3} \ldots P_{Cn}$ are increased (variation between the paths C is increased to be uniform).

For this reason, in comparison with the inner diameter $d_1$ of the heat receiver tube 21, the inner diameter $d_2$ of the inlet header tube 22 and the inner diameter $d_3$ of the outlet header tube 23 are increased to reduce each of the differences of $P_{C1}, P_{C2}, P_{C3} \ldots P_{Cn}$. When the inner diameter $d_1$, $d_2$, and $d_3$ are determined, design is made by finding an optimal resolution meeting conditions that $|P_{C1}-P_{C2}|\cong|P_{C1}-P_{C3}|\cong \ldots \cong|P_{C1}-P_{Cn}|\cong|P_{C2}-P_{C3}|\cong|P_{C2}-P_{C4}|\cong \ldots \cong|P_{C2}-P_{Cn}|\cong \ldots \cong|P_{C(n-1)}-P_{Cn}|$, and this value becomes a minimum value. By doing this, each of the differences of $P_{C1}$, $P_{C2}$, $P_{C3} \ldots P_{Cn}$ with respect to each of the paths $C_1$, $C_2$, $C_3 \ldots C_n$ is reduced, and the respective energy loss is approximately identical. As such, the flow rate distribution is further uniformized.

The operation processes, or various shapes and combinations of each component shown in the aforementioned embodiment are given as one example, and the present invention may be variously modified on the basis of design requirements without departing from the scope of the present invention.

For example, the heat receiver tubes 21 are arranged in a linear shape, and the inlet header tube 22 and the outlet header tube 23 are formed in a rectangular shape. However, the heat receiver tubes 21 may be arranged in a round shape, and the inlet header tube and the outlet header tube extending in the direction in which the heat receiver tubes 21 are arranged may be used. In this case, the heat receiver tubes 21 may be arranged in an arcuate shape or in a completely round shape, and the inlet header tube and the outlet header tube may be formed to extend in an arcuate shape or in a completely round shape. Further, when the inlet header tube and the outlet header tube are formed in the completely round shape, interiors of the inlet header tube and the outlet header tube may be partitioned into a plurality of spaces.

Further, the aforementioned embodiment is configured so that the inner diameters $d_2$ and $d_3$ of both of the inlet header tube 22 and the outlet header tube 23 are larger than the inner diameter $d_1$ of the heat receiver tube 21. However, even when only one of the inner diameters $d_2$ and $d_3$ is larger than the inner diameter $d_1$, the energy loss between the paths C can be uniformized.

Further, the aforementioned embodiment is configured so that the two inlets 20a are formed in the inlet header tube 22. However, three or more inlets may be formed, or only one inlet may be formed. The inlet 20a may be provided at an arbitrary position.

Further, the aforementioned embodiment is configured so that one outlet 20b is formed in the outlet header tube 23. However, two or more outlets may be formed. Even in this case, in comparison with when only one outlet 20b is formed, the average distance between the outlet 20b and the inlet 21a of each heat receiver tube 21 can be reduced. As such, it is possible to suppress the energy loss in the outlet header tube 23 of each path C.

In addition, the aforementioned embodiment is configured so that the air A is sent from the compressor of the gas turbine unit 102 to the solar heat receiver 5, and the air A is sent from the solar heat receiver 5 to the turbine of the gas turbine unit 102. However, the air A may be sent from another fluid supply source to the solar heat receiver 5, and the air A may be sent from the solar heat receiver 5 to another fluid supply destination. Further, a heat medium other than the air A may be heated by the heat receiver tubes 21.

INDUSTRIAL APPLICABILITY

According to the aforementioned solar heat receiver, it is possible to uniformize the temperature distribution of the plurality of paths and the heating performance for the heat medium of each path. Further, according to the aforementioned solar heat power generation device, it is possible to uniformize the temperature distribution of the plurality of paths and the heating performance for the heat medium of each path. As such, the solar heat power generation device can be configured as a system having excellent durability.

REFERENCE SIGNS LIST

2: heliostat
3: tower
5: solar heat receiver
10: casing
10a: aperture
20: piping system
20a: inlet (flow port)
20b: outlet (flow port)
21: heat receiver tube
22: inlet header tube
23: outlet header tube
A: air (working fluid)
C ($C_1$, $C_2$, $C_3 \ldots C_n$): path
H (H1, H2): solar light
d ($d_1$, $d_2$, $d_3$): inner diameter
100: solar heat power generation device
102: gas turbine unit (fluid supply source, fluid supply destination)

The invention claimed is:

1. A solar heat receiver comprising:
a casing having an aperture configured to let solar light to enter; and
a piping system provided inside the casing,
wherein the piping system includes:
   a plurality of heat receiver tubes spaced away from each other at predetermined pitches and planarly arranged in a row defining a vertical plane with an extending direction directed vertically, the plurality of heat receiver tubes having equal lengths and being configured to receive the solar light entering through the aperture of the casing;
   an inlet header tube which communicates with a first end of each of the plurality of heat receiver tubes and which is configured to flow a heat medium into the plurality of heat receiver tubes from a fluid supply source which is provided outside the casing;
   an outlet header tube which communicates with a second end of each of the plurality of heat receiver tubes and which is configured to flow the heat medium through each of the plurality of heat receiver tubes to a fluid supply destination which is provided outside the casing;
   a fluid supply passage including a fluid supply tube which extends downward vertically from the inlet header tube and is loosely inserted into a first through-hole formed in a bottom wall of the casing; and
   a fluid discharge passage including a fluid discharge tube which extends upward vertically from the outlet header tube and is loosely inserted into a second through-hole formed in a top wall of the casing,
wherein each of the inlet header tube and the outlet header tube has a larger inner diameter than each of the plurality of heat receiver tubes,
wherein the outlet header tube is set to have a larger inner diameter than that of the inlet header tube, and
wherein the inlet header tube, the outlet header tube, the fluid supply tube, and the fluid discharge tube are arranged in the casing in the vertical plane same as the plurality of heat receiver tubes, such that the inlet header tube, the outlet header tube, the fluid supply tube, and the fluid discharge tube are each bisected by a common axis defined by a flow path of the heat medium.

2. The solar heat receiver according to claim 1, wherein at least one of the inlet header tube and the outlet header tube includes a plurality of flow ports, through which the heat medium is caused to flow and which is installed between an outside and the at least one of the inlet header tube and the outlet header tube.

3. The solar heat receiver according to claim 1, wherein the heat medium is air.

4. The solar heater receiver according to claim 1, wherein the casing has a box shape having a front wall, a rear wall parallel to the front wall, the top wall arranged between the front wall and the rear wall, the bottom wall arranged parallel to the top wall and attached to the rear wall, and an inclined wall having said aperture and arranged between the front wall and the bottom wall to face obliquely downwardly.

5. The solar heater receiver according to claim 4, wherein the plurality of heat receiver tubes is arranged linearly along the rear wall at a side of the rear wall relative to the inclined wall, and
the inlet header tube includes a plurality of flow ports, through which the heat medium flows into the plurality of heat receiver tubes.

6. The solar heat receiver according to claim 1, wherein the inlet header tube has two inlets spaced apart from each other to uniformly supply the heat medium from the two inlets to the first ends of the plurality of heat receiver tubes to suppress energy loss generated therebetween, and
the outlet header tube has an outlet arranged on a middle portion between the two inlets of the inlet header tube in a horizontal direction, and a flow distance of the heat medium from the outlet to the second ends of the plurality of heat receiver tubes is longer than a flow distance from the two inlets to the first ends to inhibit an increase of a flow speed of the heat medium.

7. A solar heat power generation device comprising:
a solar heat receiver comprising:
a casing having an aperture configured to let solar light to enter; and
a piping system provided inside the casing,
wherein the piping system includes:
a plurality of heat receiver tubes spaced away from each other at predetermined pitches and planarly arranged in a row defining a vertical plane with an extending direction directed vertically, the plurality of heat receiver tubes having equal lengths and being configured to receive the solar light entering through the aperture of the casing;
an inlet header tube which communicates with a first end of each of the plurality of heat receiver tubes and which is configured to flow a heat medium into the plurality of heat receiver tubes from a fluid supply source which is provided outside the casing;
an outlet header tube which communicates with a second end of each of the plurality of heat receiver tubes and which is configured to flow the heat medium through each of the plurality of heat receiver tubes to a fluid supply destination which is provided outside the casing;
a fluid supply passage including a fluid supply tube which extends downward vertically from the inlet header tube and is loosely inserted into a first through-hole formed in a bottom wall of the casing; and
a fluid discharge passage including a fluid discharge tube which extends upward vertically from the outlet header tube and is loosely inserted into a second through-hole formed in a top wall of the casing,
wherein each of the inlet header tube and the outlet header tube has a larger inner diameter than each of the plurality of heat receiver tubes,
wherein the outlet header tube is set to have a larger inner diameter than that of the inlet header tube, and
wherein the inlet header tube, the outlet header tube, the fluid supply tube, and the fluid discharge tube are arranged in the casing in the vertical plane same as the plurality of heat receiver tubes, such that the inlet header tube, the outlet header tube, the fluid supply tube, and the fluid discharge tube are each bisected by a common axis defined by a flow path of the heat medium;
a tower built on a ground, an upper portion of the tower having the solar heat receiver;
a plurality of heliostats disposed around the tower within a predetermined angular range and each being configured to cause the solar light to enter through the aperture of the solar heat receiver; and
a gas turbine unit comprising a compressor acting as the fluid supply source, a turbine acting as the fluid supply destination, and an electric generator configured to be driven rotatably by the turbine.

* * * * *